C. R. TAYLOR.
BATTER BAKING MACHINE.
APPLICATION FILED MAR. 26, 1914.
1,196,174.
Patented Aug. 29, 1916.
3 SHEETS—SHEET 1.
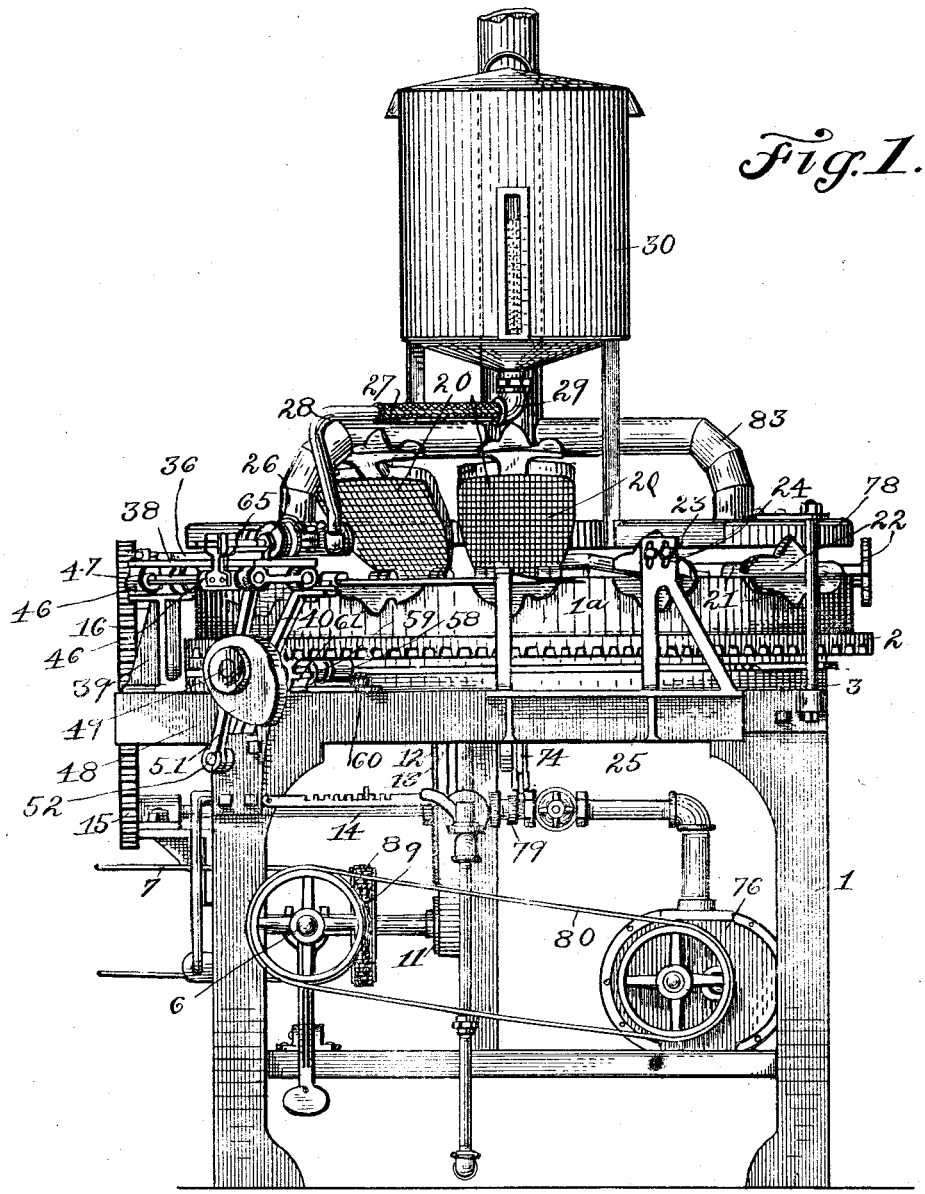
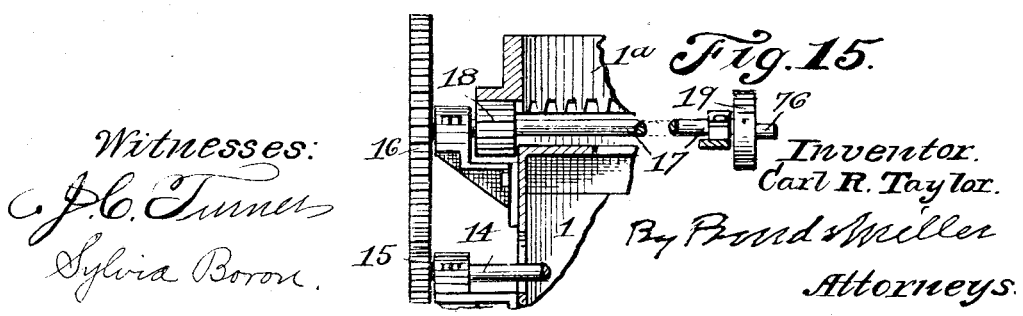

C. R. TAYLOR.
BATTER BAKING MACHINE.
APPLICATION FILED MAR. 26, 1914.

1,196,174.

Patented Aug. 29, 1916.
3 SHEETS—SHEET 2.

Witnesses:
J. C. Turner
Sylvia Boron

Inventor.
Carl R. Taylor.
By Bond & Miller
Attorneys.

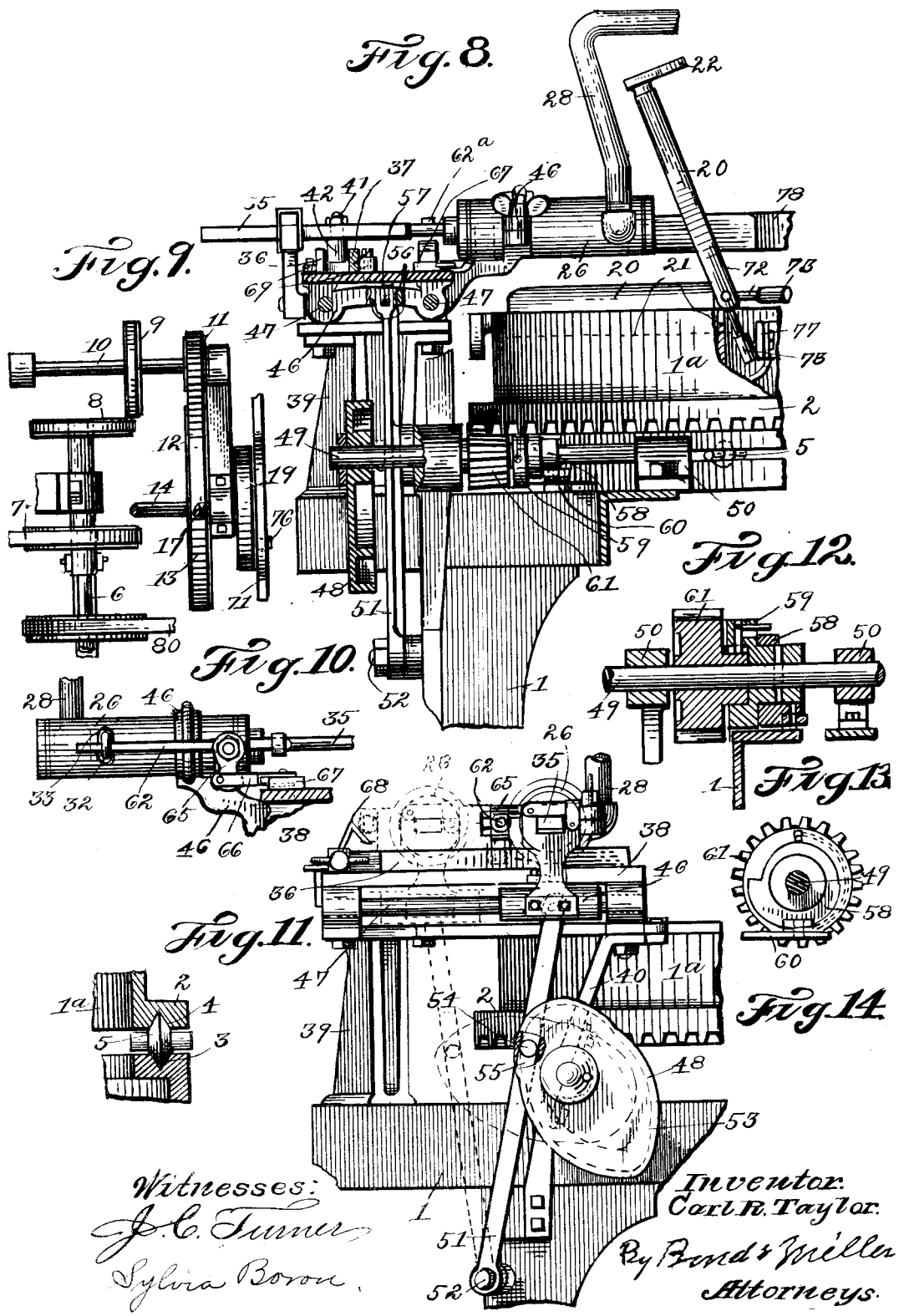

UNITED STATES PATENT OFFICE.

CARL R. TAYLOR, OF CLEVELAND, OHIO, ASSIGNOR TO THE CREAM CONE MACHINE COMPANY, OF CLEVELAND, OHIO, A CORPORATION OF OHIO.

BATTER-BAKING MACHINE.

1,196,174.    Specification of Letters Patent.    Patented Aug. 29, 1916.

Application filed March 26, 1914. Serial No. 827,312.

*To all whom it may concern:*

Be it known that I, CARL R. TAYLOR, a citizen of the United States, residing at Cleveland, in the county of Cuyahoga and State of Ohio, have invented certain new and useful Improvements in Batter-Baking Machines, of which the following is a specification.

My invention relates to improvements in batter baking machines and pertains to that class especially adapted for baking a suitable batter mixture which is adapted when baked to be converted into proper sized receptacles for ice cream, commonly known as ice cream cones, and for other purposes.

The objects of my present invention are, first, to provide means whereby the batter can be properly distributed upon a series of planetary rotating baking plates, second, to provide means for regulating the supply or quantity of batter, thereby, producing in the finished product a cake or sheet of a size to correspond with the particular size of the receptacle, third, to provide means for automatically moving the batter feeding pump in the direction of the movement of the planetary movement of the baking plates and to impart a reverse action to the batter feeding pump whereby the pump is quickly moved from between the lower baking plate and the elevated or cover plate so that the plates are not spaced apart or opened but a comparatively short time, and fourth, to so improve the parts just above described in such a manner that they can be connected to and co-act with the various parts which are old. These objects, together with other objects readily apparent to those skilled in the art, I attain by the construction illustrated in the accompanying drawings, although my invention may be embodied in a variety of other mechanical forms, the construction illustrated being chosen by way of example, and the parts which are old are shown conventionally, and I do not desire to be confined to the specific construction as to the parts that are old and well known.

In the accompanying drawings: Figure 1 is a front elevation. Fig. 2 is a top plan view. Fig. 3 is a transverse section of the feed pump showing the same closed. Fig. 4 is a similar view showing the pump open. Fig. 5 is a longitudinal section of the pump, showing the batter cut-off mechanism. Fig. 6 is a plan view showing a portion of the rotary table, the arrangement of the pump and the plunger actuating and regulating mechanism and the batter cut-off mechanism. Fig. 7 is a detailed view showing the devices designed to lift a cover of one of the baking plates. Fig. 8 is a view showing a portion of the rotary table, the pump actuating devices and the pump in proper relative relationship therewith. Fig. 9 is a diagrammatic view of the power transmitting devices. Fig. 10 is a side elevation of the pump showing the cut-off actuating mechanism. Fig. 11 is a view showing a portion of the rotary table, a portion of the base and one of the table carrying and anti-friction rolls. Fig. 12 is a sectional view of the clutch designed to throw in and out the pump actuating cam. Fig. 13 is a front face view of the clutch mechanism designed to actuate the pump actuating cam. Fig. 14 is a front view of the pump actuating cam and its actuating lever. Fig. 15 is a view showing a portion of the rotary table and the driving pinion for said table.

Similar numerals of reference indicate corresponding parts in all the figures of the drawings.

In the accompanying drawings, 1 represents the base or frame, which consists of suitable uprights and tie-bars, such as are common in frame structures of the character to which the present invention pertains, but the frame within itself does not form any specific part of the present invention. Upon the frame is mounted the rotary table 1ª, the bottom or underside of which is provided with an attached or integral toothed ring 2, which table and toothed ring is held in proper position by an annular groove 3 formed in the ring portion 1, the rotary table is also provided with a correspondingly annular groove 4 formed in the underside of the ring portion of the table and concentric with the toothed ring 2. Between the grooves are located a series of anti-friction rollers 5, said anti-friction rollers being seated in the grooves 3 and 4, whereby the table is held against lateral displacement, and is free to rotate around its axial center, whereby a true rotary motion is given to the revolving table as hereinafter described, said grooves and rollers acting or taking the place of a shaft to carry the rotary table.

In order to drive the rotary table a power shaft 6 is provided, which is driven by the belt 7, which belt leads to any source of power. Upon the power shaft 6 is located the wheel 8, which wheel drives the wheel 9 mounted upon the shaft 10, and upon the shaft 10 is located the pulley 11, from which pulley leads the belt 12 to and around the wheel 13 which drives the shaft 14, said shaft having mounted thereon the pinion 15, which pinion meshes with the large gear wheel 16, which gear wheel drives the shaft 17, and upon the shaft 17 is mounted the gear wheel 18, which gear wheel meshes with the toothed ring 2, thereby driving the table 1ª. Upon the shaft 17 is located a cam 19, the purpose of which will be hereinafter described.

Upon the rotary table proper and carried therewith are a series of baking plates made up of what might be termed upper and lower members 20 and 21. The upper members 20 being hinged at their innermost ends so that they can be lifted at an angle to the lower members 21 by which arrangement the batter designed to be baked can be distributed upon the lowermost baking plate, after which the hinged or upper baking plate 20 is lowered or brought down into a plane parallel with the plane of the lowermost baking plate. These baking plates are hinged axially so that they can be turned over when in closed position by suitable mechanism which within itself does not form any specific part of the present invention, but the general outline is illustrated for the purpose of better coupling up the novel features pertaining to my invention. The free ends of the upper or hinged baking plates 20 are provided with the upward extending flanges 22, which come in contact with suitable brackets or contact elements 23, so arranged that they will give a half revolution to the baking plates as they pass the trip blocks 24 in their annular or planetary movement, the trip blocks 24 being carried by the bracket 25.

It will be understood that the batter designed to be baked must be intermittently fed upon the baking plates 21 and in order to provide for thus intermittently feeding the batter, a cylinder 26 is provided, into which cylinder the batter is intermittently fed through a flexible tube 27, which flexible feed tube is preferably connected to a rigid tube 28, which is connected to the cylinder 26 and the opposite end of said flexible tube connected to the elbow 29, which elbow is connected to the batter tank 30, said batter tank being elevated so that the batter will be moved or carried downward by gravity. Within the cylinder 26 is located the sleeve 31, to which sleeve is attached a pin 32, which pin is located through the elongated slot 33 formed in the cylinder 26, which pin is for the purpose of imparting a rocking movement to the sleeve 31. The devices for imparting the rocking movement to the sleeve by means of the pin 32 will be described hereinafter. Within the cylinder 26 is located a piston head 34, to which piston head is attached the piston rod 35.

For the purpose of imparting the proper reciprocating movement to the piston rod 35 and the piston head 34, the curved flanges 36 and 37 are provided, which curved flanges are carried by and located upon the plate 38, which plate is held in fixed relative position with reference to the frame proper by means of suitable supports or brackets 39 and 40. To the piston rod 35 is attached a pin 41, upon which pin is mounted the anti-friction roller 42, said roller being located between the curved flanges 36 and 37 and as the piston rod 35 is moved back and forth between the ends of the curved flanges 36 and 37 a reciprocating movement will be imparted to the piston rod, thereby imparting a reciprocating movement to the piston head 34. The inward movement of the piston head 34 being for the purpose of forcing the batter out of the cylinder through the apertures 43 and 44, when said apertures are registered with reference to each other as illustrated in Fig. 4.

For the purpose of admitting batter into the cylinder 26 the sleeve 31 is provided with the aperture 45 and when said aperture is brought into the position shown in Fig. 3, the batter is free to enter the cylinder 26, but cannot be forced out of said cylinder until the apertures 43 and 44 register as shown in Fig. 4. In other words the cylinder 26 is alternately opened for the admission of batter and for the propulsion of batter out of said cylinder on to the baking plates. In order to give sufficient time to deposit the necessary amount of batter upon the baking plates 21 and also for better distributing the batter, means must be provided for moving the cylinder 26 over the baking plates, said movement being a lateral movement to the length of the cylinder or what might be termed a sidewise movement.

During the time the cylinder 26 is moving forward or in the direction of the planetary movement of the baking plates the piston head 34 is moved inward and the batter forced out. In order that the upper baking plates may not be elevated for any considerable length of time, means should be provided for moving the cylinder 26 backward or in the opposite direction from the planetary movements of the baking plates 20 and 21 in order that the cylinder will be brought out of the way and permit the upper baking plates 20 to be lowered into the normal or baking positions and in order to provide for this sweeping or backward and forward movement of the cylinder 26 means must be provided whereby such movement can be brought about. For this purpose the cylinder 26 is mounted upon the bracket 46, which bracket is carried by the parallel rods 47, said rods being held in fixed relative position with reference to the frame proper and below the plate 38. Below the rods 47 is located the cam 48, which cam is mounted upon the shaft 49, said shaft being journaled in suitable bearings 50, said bearings being held in fixed position by reference to the frame.

To some fixed part of the frame or its equivalent is pivotally connected the lever 51, which is extended downward and its pivotal point 52 located below the cam 48. The cam 48 is provided with the cam-race 53, in which cam-race the anti-friction roller bearing 54 is located, which is mounted upon the arm 55, secured to the cam actuated lever 51. It will be understood that when the shaft 49 is rotated the cam lever 51 will be moved back and forth by means of the cam-race 53 formed in the face of the cam 48, said cam being so formed and arranged that the lever 51 can be moved back and forth the distance desired without interfering or coming in contact with the shaft 49, or in other words the throw of the lever 51 is entirely upon one side of the shaft 49. The cam actuated lever 51 is operatively connected to the bracket 46, preferably by extending said lever through the opening or slot 56 and for the purpose of reducing friction the anti-friction roller 57 is provided. The attachment of the cam lever 51 to the bracket 46 should be made between the parallel rods 47.

It will be understood that as the cam 48 is rotated the cylinder 26 together with the different parts connected to said cylinder will be moved back and forth over the baking plates 21, the movements of said cylinder being so timed that they will take place during the time the baking plates 20, just above the baking plates over which the cylinder 26 is moved, will be in a tilted position such as shown in Fig. 8, thereby permitting proper clearance for the movements of the cylinder 26. For various purposes it may be desired to stop the action or movement of the cylinder 26, without stopping the entire machine, and in order to provide for thus stopping the sweeping or what might be termed the horizontal movement of the cylinder 26 a clutch made up of fixed and loose members 58 and 59 is provided, the clutch member 59 being slidably mounted upon the shaft 49 and is brought into and out of engagement by means of an ordinary clutch lever 60 (see Fig. 1).

Upon the shaft 49 is loosely mounted the gear wheel 61, which gear wheel rotates the shaft 49 by reason of its meshing with the toothed ring 2 when the clutch members are coupled in such a manner that they will rotate the gear wheel 61 but when the clutch is uncoupled, said gear wheel 61 does not rotate the shaft 49, but runs idly thereon, thereby leaving the cam 48 and the parts driven by said cam at rest.

For the purpose of rocking the sleeve 31 by means of the outward extending pin 32, a lever or rock arm 62 is provided, which is pivoted intermediate its ends upon the post 63 by means of the collar 64 or its equivalent. One end of the rock arm 62 is connected to the pin 32 in any convenient and well known manner. To the rock arm 62 is attached the laterally extending arm 65, to which is pivotally attached the strike bar 66, which strike bar is so located that it will come in contact with the trip block 67 and rock the rock arm 62 in one direction and in the direction to open or bring into registration the apertures 43 and 44 and as the cylinder 26 is moved by means of the cam lever 51 and the different parts connected to said lever the piston rod 35 will be moved inward by means of the cam shaped flanges 36 and 37. As the cylinder 26 is moved by the cam lever 51 one end of the rock arm 62 and the opposite end from that connected to the pin 32 is struck by the strike plate 68, which rocks the rock arm 62 in the opposite direction, thereby bringing the aperture 45 into the position shown in Fig. 3, and permitting batter to enter the cylinder 26 as the piston head is moved away from the intake port or feed pipe proper. It will therefore, be understood that as the cylinder 26 is moved in one direction the batter will be distributed upon the baking plates but just before or at the limit of the forward movement the supply of batter to the batter plates is cut off during the backward movement of the cylinder; but when the cylinder 26 is given a reverse motion and the piston head forced inward the batter will be expelled from the cylinder.

It will be understood that the amount of batter designed to be fed or placed upon the individual baking plates varies, reference being had to the size of the cakes designed to be baked, and in order to regulate the supply of batter from time to time the curved flanges 36 and 37 are pivoted upon the plate 38, by means of the pivotal connections 69 and for the purpose of moving said flanges in unison and holding them in proper parallel relationship the tie-bar 70 is provided. It will be understood that more than one tie-bar may be employed if desired, but the curved flange 36 may be connected in substantially the same manner as the curved bar 37, as it will be understood that said curved bars should be held in proper relationship with reference to each other.

When it is desired to change the amount of batter or to change the length of the stroke of the piston rod 35 and the piston head 34, the adjusting screw 71 is provided, which screw is connected so as to change the position of the curved bars by rotating the screw 71 in opposite directions, said screw being so connected to the curved flanges 37 that it will move said curved flanges with the movements of the screw 71.

For the purpose of elevating the various upper baking plates 20 at intervals during their horizontal movement and when they are passing the cylinder 26 the hinged ends of said plates are provided with inward extending arms 72 upon which are mounted rollers 73. For the purpose of pressing the arms 72 downward as illustrated in Fig. 8 the rock arm 74 is provided, which arm is provided with the elongated slot 75, in which slot is located the pin 76, which pin is connected to the face of the cam or disk 19, which disk is mounted upon the shaft 17. The arm 74 is pivotally connected to some fixed part of the frame 1 and as the shaft 17 is rotated the arm 74 will be brought down and come in contact with the anti-friction rollers 73, thereby pressing the arms 72 down and for the purpose of holding the baking plates 20 in their elevated positions a track or bar 77 is provided, which track or bar holds the baking plates 20 in their elevated position, until after the roller 73 has passed said track or bar, at which time the baking plates are free to fall into their normal positions.

Upon the shaft 10 is located the pulley 11, which drives the shaft 14, which shaft in turn drives the shaft 17 upon which shaft the cam 19 is located, thereby giving proper timed relationship as between the rotating table and the baking plates 20 and 21. By reason of the fact that the pinion 18 which drives the rotary table is securely mounted upon the shaft 17, the cam 19 is also securely mounted upon the shaft 17.

In order to provide for the proper baking of the batter a proper gas burner should be provided, which is located under the ring 2, and for the purpose of giving the proper combustion a fan 76 is employed, which fan is of the usual construction and is driven by means of the belt 80. This construction does not form any specific part of the present invention, but is simply illustrated to show a complete operative machine.

For the purpose of retaining the heat and better baking the batter the hood 78 is provided which is held in proper elevation by suitable standards such as 81 and for the purpose of conveying the fumes emanating from the products of combustion, suitable pipes 82 may be employed. It will be understood that the hood or covering 78 should not extend entirely around and above the turn table proper but only partially around so that the baking plates may be manipulated to receive the batter and to remove the cakes after they have been properly baked. For the purpose of reducing the friction, the rock arm 62 is provided with the anti-friction roller 62ª, which comes in contact with the strike plate 68.

It will be understood that after the supply of batter has been cut off when the cylinder 26 has been moved forward and over an individual baking plate, there will be some dripping of the batter, owing to the plastic condition of the batter and in order to prevent this dripping from becoming deposited or dropped between the baking plates or any other place other than where it is intended to be dropped, the forward movement of the cylinder over the plates is more rapid than the forward movement of the plates, by which arrangement the cylinder 26 will move near or to the forward edge of a given plate and will then pass backward over the plate, by which arrangement the drip from the cylinder after the forced feed has been cut off will be properly deposited upon the plate or more specifically upon the top of the batter previously distributed or fed upon the baking plates. This is an important feature, owing to the fact that the cakes when baked will not have any ragged edges or what might be termed drip extensions. The differentiated forward movements as between the baking plates and the cylinder 26 is brought about by means of the cam 48 and the cam actuated lever 51, the movements of the cylinder 26 being brought about independent of the rotation of the ring 2.

Having fully described my invention what I claim as new and desire to secure by Letters Patent, is—

1. In a baking machine, a frame, a rotary table mounted thereon, means for rotating said table in a horizontal plane, a series of baking plates formed in pairs carried by said rotary table, a cylinder provided with intake and outlet apertures, a hollow sleeve located within said cylinder, said sleeve provided with intake and outlet apertures, a pin secured to said hollow sleeves and extended through the cylinder, a rock arm connected to said pin and means for rocking said arm in opposite directions, a piston head located within the cylinder, a piston rod connected to said piston head and extended beyond the cylinder, a plate held in fixed relation with reference to the frame, curved flanges carried by said plate, said curved flanges adapted to impart reciprocating movement to the piston rod by the lateral movements of the cylinder and means for imparting lateral movement to said cylinder.

2. In a baking machine, a frame, a rotary table mounted thereon, means for rotating said table in a horizontal plane, a series of baking plates formed in pairs carried by said rotary table, a cylinder provided with intake and outlet apertures, a hollow sleeve located within said cylinder, said sleeve provided with intake and outlet apertures, a pin secured to said hollow sleeve and extended through the cylinder, a rock arm connected to said pin and means for rocking said arm in opposite directions, a piston head located within the cylinder, a piston rod connected to said piston head and extended beyond the cylinder, a plate held in fixed relation with reference to the frame, curved flanges carried by said plate, and means for adjusting the position of said curved flanges, said curved flanges adapted to impart reciprocating movement to the piston rod during the lateral movements of the cylinder and means for imparting lateral movement to said cylinder.

3. In a baking machine of the class described, the combination with a rotary table carrying a plurality of baking plates formed in pairs, one of each of the pairs of baking plates hinged at their inner ends, means for holding the hinged baking plates in elevation during a portion of each revolution of the rotary table, a cylinder provided with inlet and outlet apertures, means for moving said cylinder in the direction of the movement of the table and in the opposite direction of said rotary movement, a hollow sleeve located within the cylinder, means for rocking the sleeve during the backward and forward movement of said cylinder, a piston located within said cylinder, and means for adjusting the movements of said piston.

4. In a baking machine, the combination with a rotary table carrying a plurality of baking plates formed in pairs, one of each of the pairs of baking plates hinged at their inner ends, a batter receiving cylinder provided with inlet and outlet apertures, a batter containing reservoir, means for feeding batter from said reservoir to said cylinder, a hollow sleeve located within said cylinder and a piston head located within said cylinder, a piston rod connected to said piston head and extended beyond the outer end of said batter receiving cylinder, said rod provided with an anti-friction roller, pivoted curved flanges adapted for contact with said anti-friction roller, said curved flanges adapted to impart reciprocating movement to the piston rod and piston head, and means for changing the position of said curved arms and means for moving the cylinder in opposite directions.

In testimony that I claim the above, I have hereunto subscribed my name in the presence of two witnesses.

CARL R. TAYLOR.

Witnesses:
- MYRMA WICKOSEN,
W. B. PRITZ.